Patented June 22, 1926.

1,589,358

UNITED STATES PATENT OFFICE.

JOHN N. BURDICK, OF BUFFALO, NEW YORK, ASSIGNOR TO CARBIDE AND CARBON CHEMICALS CORPORATION, A CORPORATION OF NEW YORK.

PROCESS OF MAKING OLEFINE OXIDES.

No Drawing.     Application filed August 7, 1923.     Serial No. 656,304.

The invention is a process of making olefine oxides, homologous with ethylene oxide

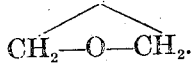

$CH_2$—O—$CH_2$.

In accordance with the invention, the olefine chlorhydrins (bodies of the type

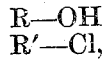

R—OH
R'—Cl, where R and R' are alkylene groups) are decomposed by the action of strong alkalis such as the hydroxids of the alkali and alkaline-earth metals. The process is especially applicable to the production of olefine oxides from the corresponding highly water-soluble chlorhydrins containing less than five carbon atoms in the molecule.

The known methods of making such chlorhydrins give dilute solutions very difficult to concentrate, since the chlorhydrins form azeotropic mixtures with water. The reaction whereby the chlorhydrins are decomposed with strong alkalis to give olefine oxides has been known for over half a century, but it has hitherto been regarded as impossible to obtain acceptable yields of the oxides by this method unless very strong solutions of chlorhydrin were used. Thus, a recent patent, Brooks 1,446,872, dated Feb. 27, 1923, contains the following statement on this point:

"If this reaction between a chlorhydrin and a caustic alkali is carried out in the presence of considerable water, very poor yields of oxide result, as described in the chemical literature. Glycols and condensation products of unknown structure are the chief products resulting under these conditions, as for example with a 20 per cent solution of ethylene chlorhydrin and a 20 per cent solution of caustic soda a yield of ethylene oxide equivalent to about 12 per cent of the theory is obtained. If substantially anhydrous chlorhydrins are subjected to the action of solid and substantially dry caustic alkali (this expression of course including lime), excellent yields of the oxides may be obtained."

Accordingly, so far as I am aware, all workers in this field have resorted to the difficult concentration of the chlorhydrin solution before applying the oxide-forming reaction.

Contrary to this universal belief, I have found that dilute solutions of chlorhydrins will give high yields of olefine oxides when treated with strong alkalis. Solutions containing 10% or less of chlorhydrin will give 90% or more of the theoretical yield of olefine oxide. The quantity of water is immaterial and the solutions may be as dilute as is consistent with a reasonable size for the apparatus, good yields being nevertheless obtained. In other words, the strength of the solution is as free from restrictions as is generally the case in chemical processes.

A single condition must be fulfilled in order to secure the result referred to above, this being that the olefine oxide formed must be removed at such a rate that there is no substantial accumulation of it in the solution.

The invention is not restricted to any particular method of removing the olefine oxide as formed. Heating the solution in which the reaction takes place to or near its boiling point under atmospheric or reduced pressure, is usually the simplest, and is preferred; but other expedients giving like results may be used. Appropriate methods should be used to separate the evolved oxide from any steam or other gas with which it may come off.

In a preferred form of the invention the chlorhydrin solution, a 10% solution of ethylene chlorhydrin, is placed in a kettle provided with a rectifying column surmounted by a reflux condenser. The chlorhydrin solution is heated to boiling and a solution of caustic soda added continuously at such a rate as to bring about a suitable evolution of ethylene oxide. The oxide together with steam passes into the rectifying column where the steam is mostly condensed and returned to the kettle. The ethylene oxide, having a much lower boiling point than water, passes through the reflux condenser as vapor and is liquefied in a separate condenser cooled to a lower temperature, for example with cold brine. A yield or more than 90% will be obtained.

The kettle referred to should be heated to such a temperature that the oxide is evolved practically as fast as formed without an undue amount of steam passing off with it. The caustic solution may be of any convenient strength, but since strong caustic solutions are usually as cheap, referred to the contained alkali, as dilute solutions, and since strong solutions permit the use of smaller apparatus, they are preferred.

For making propylene oxide the procedure is similar but propylene chlorhydrin is of course used.

Subject to the other conditions noted, many modifications are possible. Alkalis other than caustic soda, and other methods of mixing the reacting materials, may of course be used. As prior workers were unanimous in their view that it was impossible to obtain good yields with solutions containing less than 40% chlorhydrin, and preferred still more highly concentrated solutions, I regard the use of all solutions having chlorhydrin concentrations of less than about 40%, under such conditions as to give acceptable yields of olefine oxides, as a new field, and I regard this entire field as the scope of my invention.

As used in the appended claims, "dilute" chlorhydrin solution imports a chlorhydrin solution of less than about 40% chlorhydrin content. Solutions containing less than about 15% chlorhydrin are most readily obtainable, and the use of solutions within this range of concentration is a preferred application of my invention.

I claim:

1. Process of making olefine oxides which comprises reacting upon a dilute solution of a chlorhydrin with a strong alkali and removing the olefine oxide as formed.

2. The invention according to claim 1 in which the concentration of the chlorhydrin solution is not higher than about 15%.

3. Process of making olefine oxides which comprises reacting upon a dilute solution of a chlorhydrin with a strong alkali and removing the olefine oxide as formed by heating the reaction liquid.

4. The invention according to claim 3 in which the concentration of the chlorhydrin solution is not higher than about 15%.

5. Process of making olefine oxides which comprises reacting upon a dilute solution of a chlorhydrin containing less than five carbon atoms in its molecule with a strong alkali and removing the olefine oxide as formed.

6. The invention according to claim 5 in which the concentration of the chlorhydrin solution is not higher than about 15%.

7. Process of making olefine oxides which comprises reacting upon a dilute solution of a chlorhydrin containing less than five carbon atoms in its molecule with a strong alkali, and removing the olefine oxide as formed by heating the reaction liquid.

8. The invention according to claim 7 in which the concentration of the chlorhydrin solution is not higher than about 15%.

9. Process of making ethylene oxide which comprises reacting upon a dilute solution of ethylene chlorhydrin with a strong alkali, and removing the ethylene oxide as formed by heating the reaction liquid.

10. Process of making olefine oxides which comprises adding a solution of a caustic alkali to a dilute solution of a chlorhydrin containing less than five carbon atoms in its molecule while maintaining the chlorhydrin solution at such temperature that the olefine oxide is evolved as formed, and separating the olefine oxide so produced from the accompanying water vapor.

11. Process of making ethylene oxide which comprises adding to a dilute solution of ethylene chlorhydrin a solution of caustic alkali while maintaining the chlorhydrin at such temperatures that the ethylene oxide is evolved as formed, and separating the ethylene oxide so produced from the accompanying water vapor.

In testimony whereof, I affix my signature.

JOHN N. BURDICK.